C. R. PIGGINS.
DRIVING AXLE FOR AUTOMOBILES AND TRUCKS.
APPLICATION FILED JULY 1, 1912.
1,117,700.
Patented Nov. 17, 1914.
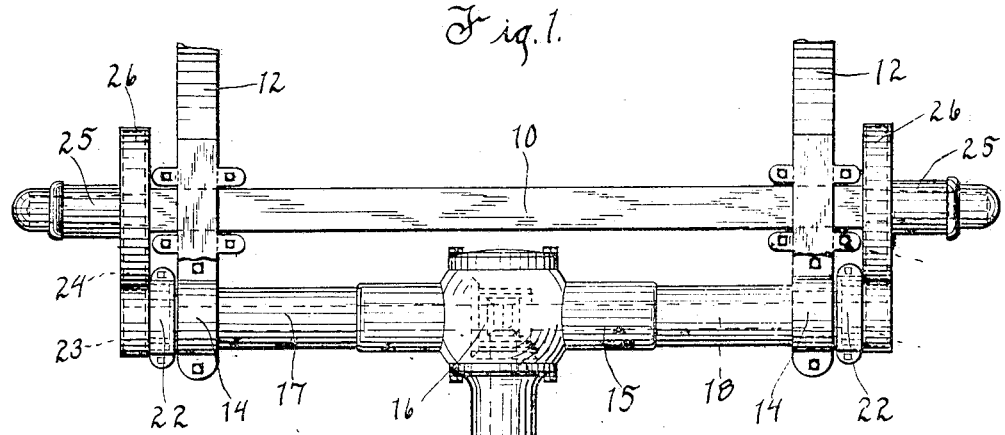
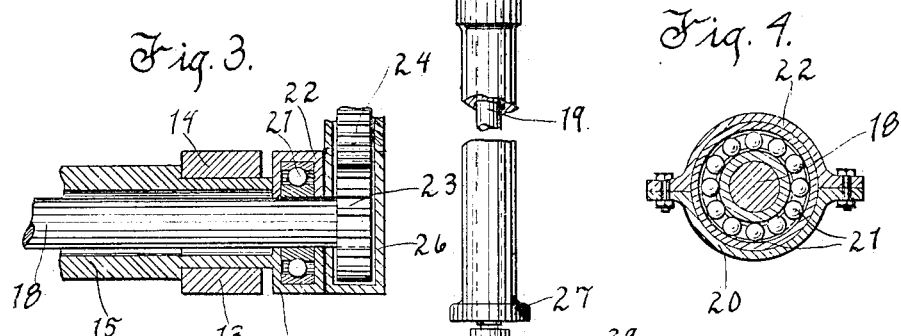
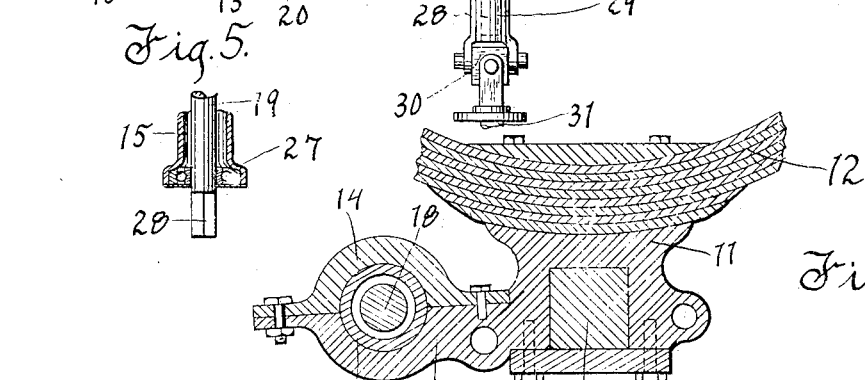
WITNESSES:
Arthur F. Miller
Katherine Hott
INVENTOR.
Charles R. Piggins
By Morsell & Caldwell
ATTORNEYS.

UNITED STATES PATENT OFFICE.

CHARLES R. PIGGINS, OF RACINE, WISCONSIN, ASSIGNOR TO PIGGINS MOTOR TRUCK COMPANY, OF RACINE, WISCONSIN, A CORPORATION OF WISCONSIN.

DRIVING-AXLE FOR AUTOMOBILES AND TRUCKS.

1,117,700.  Specification of Letters Patent.  Patented Nov. 17, 1914.

Application filed July 1, 1912.  Serial No. 706,934.

*To all whom it may concern:*

Be it known that I, CHARLES R. PIGGINS, a citizen of the United States, and resident of Racine, in the county of Racine and State of Wisconsin, have invented new and useful Improvements in Driving-Axles for Automobiles and Trucks, of which the following is a description, reference being had to the accompanying drawings, which are a part of this specification.

This invention relates to the construction of driving axles for automobiles and the like and though particularly designed for automobile trucks is adapted for use with automobiles and trucks generally and has for its object to provide a rear axle having the driving wheels loosely mounted thereon and geared with a pair of propelling shafts contained in a shaft casing having pivotal connection with said axle and pivotal and swivel connection with the engine, the shaft casing thus constituting a yielding connection between the vehicle frame and the rear axle and containing the driving connections between the engine and the rear wheels.

With the above and other objects in view the invention consists in the driving axle for automobiles as herein claimed and all equivalents.

Referring to the accompanying drawings in which like characters of reference indicate the same parts in the different views: Figure 1 is a plan view of a driving axle for automobiles and trucks constructed in accordance with this invention; Fig. 2 is a sectional view on the plane of line 2—2 of Fig. 1 showing the pivotal connection for the shaft casing; Fig. 3 is a longitudinal sectional elevation of the pinion and gear driving connection of one of the propelling shafts; Fig. 4 is a sectional view of the ball bearing for one of the propelling shafts; and, Fig. 5 is a detail view of the motor connected end of the driving shaft and its casing.

In these drawings 10 indicates a rear axle provided with spring seats 11 containing springs 12 constituting a connection between the axle and the vehicle frame not shown. The axle 10 is also provided with forwardly extending arms 13 which may be integral with the spring seats 11 as shown or otherwise and bearing caps 14 convert the arms 13 into pivotal bearings for the shouldered ends of a T shaped tubular shaft casing 15. This shaft casing incloses a differential gear 16 at the enlarged globular junction of its arm members with its stem member, the two propelling shafts 17 and 18 from the differential gear being contained within the arm members of the shaft casing and the driving shaft 19 being contained within the stem member thereof. The shaft casing 15 as best shown in Fig. 3 continues beyond the bearings formed by arms 13 and its ends terminate in bearing housings 20 containing ball bearings 21 for the propelling shafts 17 and 18. As shown in Fig. 4 these bearing housings 20 are provided with removable caps 22 for access to the bearing. Beyond the bearing each of the propelling shafts 17 and 18 is provided with a pinion 23 meshing with a larger gear wheel 24 on a wheel hub 25 which is loosely mounted on the end of the axle 10. A gear casing 26 surrounds pinion 23 and the gear wheel 24. The forward end of the driving shaft 19 has a ball bearing 27 between it and the end of the stem portion of the shaft casing 15 and beyond this bearing said driving shaft is square as shown at 28 in Fig. 5 to form a slip joint with a correspondingly shaped sleeve 29 of universal joint 30 which connects the end of the driving shaft 19 with a shaft 31 on a speed changing gear not shown or from the engine direct.

By means of the driving axle construction of this invention the T shaped shaft casing besides serving to inclose and protect from dust the driving connection for the rear wheels of the vehicle also constitutes the support for the differential gearing and by reason of its pivotal connection with the arms of the axle and its pivotal connection on the driving shaft 19 by means of the universal joint 30 the rear axle may move toward and away from the vehicle frame as permitted by the springs without interfering with the driving connection, the lengthening and shortening of the distance between the rear axle and the universal joint 30 at such times being permitted by the slip joint at the front end of the driving shaft 19. Furthermore a tilting action of the rear axle is permitted so that either rear wheel may rise or fall independent of the other rear wheel by the swivel action of the shaft casing 15 on the driving shaft 19.

It is found in practice that with motor trucks and the like this driving axle construction does not require the presence of radius bars, for the action of the springs alone is sufficient to keep the axle in its proper relative position and such forward or rearward movement as may be made by the axle is permitted by the slip joint connection of the driving shaft 19 without disturbing the driving connections.

What I claim as new and desire to secure by Letters Patent is:

1. A driving axle construction for automobiles, comprising an axle member, arms thereon, a T shaped tubular shaft casing pivotally mounted on the arms, a driving shaft fitting within the stem portion of the shaft casing, a differential gearing contained within the central portion of the shaft casing, propelling shafts in the outwardly extending arm portions of the shaft casing, pinions on the propelling shafts, wheel hubs on the ends of the axle member, gear wheels on the wheel hubs meshing with the pinions, and a universal joint on the end of the driving shaft for connecting it with an engine or the like.

2. A driving axle construction for trucks, automobiles and the like, comprising an axle member, arms thereon, a T shaped tubular shaft casing having its oppositely extending arm portions pivotally mounted in the arms of the axle member, a driving shaft within the stem portion of the shaft casing, a differential gear contained within the central portion of the shaft casing, propelling shafts within the oppositely extending arm portions of the shaft casing and connected by the differential gearing with the driving shaft, pinions on the ends of the propelling shafts, wheel hubs loosely mounted on the ends of the axle member, gear wheels on the wheel hubs meshing with the pinions, a sleeve splined on the end of the driving shaft, and a universal joint on the sleeve for connecting the driving shaft with an engine or the like.

3. A driving axle construction for automobiles, and trucks comprising an axle member, spring seats thereon, arms extending from the spring seats, a T shaped tubular shaft casing having arm members with shouldered ends pivotally fitting within the arms of the spring seats, a driving shaft contained within the stem portion of the T shaped tubular shaft casing, a differential gear contained within the central portion of the shaft casing, propelling shafts in the oppositely extending arm portions of the shaft casing connected by the differential gear with the driving shaft, ball bearings between the ends of the arm portions of the shaft casing and the propelling shafts and between the ends of the stem portion of the shaft casing and the driving shaft, pinions on the ends of the propelling shafts, wheel hubs loosely mounted on the ends of the axle member, gear wheels on the wheel hubs meshing with the pinions, gear casings inclosing the gear wheels and the pinions, and a universal joint having a splined connection with the end of the driving shaft and forming a connection for the driving shaft with an engine shaft or the like.

In testimony whereof, I affix my signature, in presence of two witnesses.

CHARLES R. PIGGINS.

Witnesses:
C. H. KEENDY,
ARTHUR F. MILLER.

Copies of this patent may be obtained for five cents each, by addressing the "Commissioner of Patents, Washington, D. C."